US012659896B2

(12) United States Patent
Zhou et al.

(10) Patent No.: US 12,659,896 B2
(45) Date of Patent: Jun. 16, 2026

(54) USER EQUIPMENT ASSISTED UPLINK SYNCHRONIZATION FOR INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 596 days.

(21) Appl. No.: 17/857,738

(22) Filed: Jul. 5, 2022

(65) Prior Publication Data

US 2024/0015680 A1 Jan. 11, 2024

(51) Int. Cl.
| | |
|---|---|
| *H04W 56/00* | (2009.01) |
| *H04L 5/00* | (2006.01) |
| *H04W 36/32* | (2009.01) |

(52) U.S. Cl.
CPC ....... *H04W 56/0045* (2013.01); *H04L 5/0051* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 8,873,443 B2 | 10/2014 | Haim et al. | |
| 10,142,952 B2 | 11/2018 | Dinan | |

| | | | | |
|---|---|---|---|---|
| 2013/0114505 A1* | 5/2013 | Haim | ................... | H04W 52/32 |
| | | | | 370/328 |
| 2014/0226609 A1* | 8/2014 | Hooli | ................... | H04W 72/23 |
| | | | | 370/329 |
| 2016/0014706 A1* | 1/2016 | Vajapeyam | ......... | H04W 56/001 |
| | | | | 370/328 |
| 2018/0014263 A1 | 1/2018 | Dinan | | |
| 2018/0176905 A1* | 6/2018 | Li | ........................ | H04W 52/14 |

(Continued)

OTHER PUBLICATIONS

International Search Report and Written Opinion—PCT/US2023/026317—ISA/EPO—Oct. 17, 2023.

(Continued)

*Primary Examiner* — Jeffrey M Rutkowski
*Assistant Examiner* — Mehedi S Aley
(74) *Attorney, Agent, or Firm* — Procopio, Cory, Hargreaves & Savitch LLP

(57) ABSTRACT

Methods, systems, and devices for wireless communications are described. A user equipment (UE) may monitor for reference signals from a first, reference cell and a second, deactivated cell, and the UE may report a timing difference between a first timing advance of the first cell and a second timing advance of the second cell. In some cases, the UE may report a timing difference periodically, and, in other cases, the UE may report a timing difference aperiodically. Once a network entity receives the timing difference, the network entity may determine the second timing difference for the UE to use to communicate with the second cell. The network entity may then signal the second timing difference to the UE when the second cell is activated for communications with the UE, and the UE may use the second timing advance to communicate with the second cell.

22 Claims, 14 Drawing Sheets

(56)          References Cited

U.S. PATENT DOCUMENTS

| | | | |
|---|---|---|---|
| 2019/0141590 A1* | 5/2019 | Li | ........................ H04W 52/245 |
| 2019/0306775 A1 | 10/2019 | Duan | |
| 2022/0124786 A1* | 4/2022 | Mukherjee | ........ H04W 74/0833 |
| 2023/0102742 A1* | 3/2023 | Tseng | ................ H04W 74/0833 |
| | | | 370/329 |
| 2023/0209423 A1* | 6/2023 | Xu | ........................ H04W 76/30 |
| | | | 370/331 |

OTHER PUBLICATIONS

MEDIATEK: "New WID on Further NR Mobility Enhancements", 3GPP TSG RAN Meeting #94e, RP-213565, Electronic Meeting, Dec. 6-17, 2021, 5 pages.

* cited by examiner

Configured cell set 225-b

TAG 3 c2  c1  c3  c5

225-a  TAG 1 c4  TAG 2  c6

225-c

205

115-a

210 — Cells outside of configured cell set

215 — Activated cells

220 — Deactivated cells

200

105-a 105-b 115-b 105-c

305 — Reference signals

310 — Timing advance difference

300

115-c 105-d 105-e

Higher layer control message
including an indication of a
configuration of a set of cells

405

Reference signal

410

Reference signal

415

Timing advance difference

420

Lower layer control message
for L1/L2 mobility

425

Control information/data

430

400

510    520    515

505

500

910

920

915

905

900

130          105          115

Network
Entity

Transceiver

1210

Antenna

1215

Communications
Manager

1220

Memory

Code

1230

1225

1240

Processor

1235

1205

1200

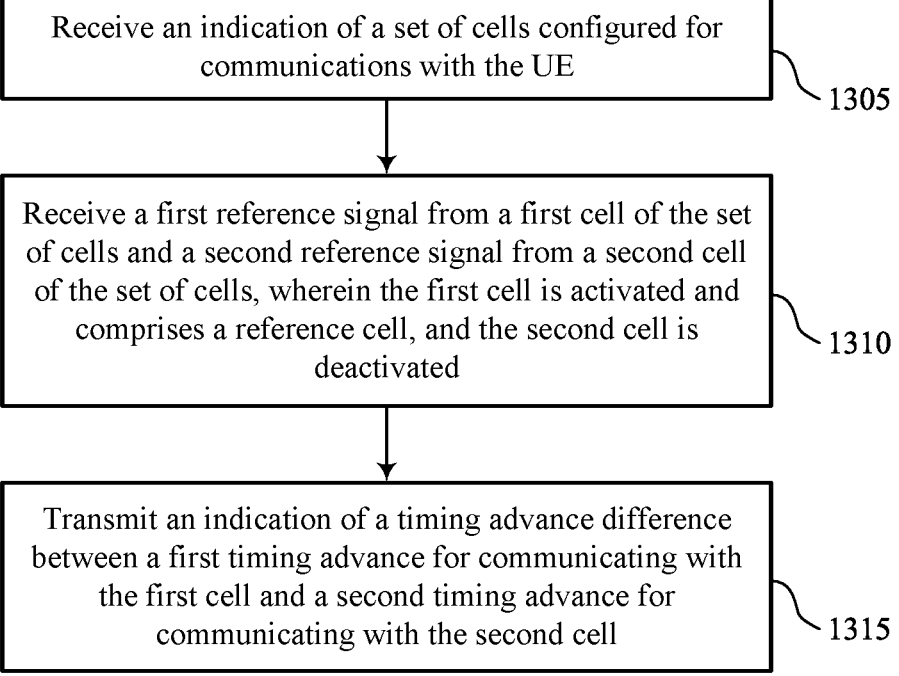

Receive an indication of a set of cells configured for communications with the UE

1305

Receive a first reference signal from a first cell of the set of cells and a second reference signal from a second cell of the set of cells, wherein the first cell is activated and comprises a reference cell, and the second cell is deactivated

1310

Transmit an indication of a timing advance difference between a first timing advance for communicating with the first cell and a second timing advance for communicating with the second cell

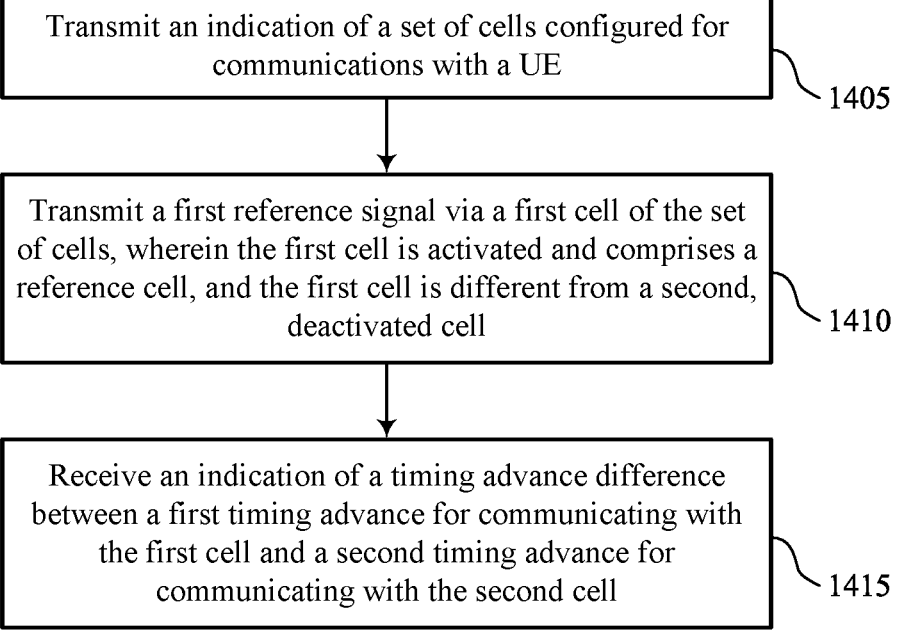

Transmit an indication of a set of cells configured for communications with a UE ⟍ 1405

Transmit a first reference signal via a first cell of the set of cells, wherein the first cell is activated and comprises a reference cell, and the first cell is different from a second, deactivated cell ⟍ 1410

Receive an indication of a timing advance difference between a first timing advance for communicating with the first cell and a second timing advance for communicating with the second cell ⟍ 1415

USER EQUIPMENT ASSISTED UPLINK SYNCHRONIZATION FOR INTER-CELL MOBILITY

FIELD OF TECHNOLOGY

The following relates to wireless communications, including user equipment assisted uplink synchronization for inter-cell mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, a network entity may configure a set of cells for communications with a UE. Improved techniques for supporting communications between a UE and one or more cells in a configured set of cells may be desirable.

SUMMARY

The described techniques relate to improved methods, systems, devices, and apparatuses that support user equipment (UE) assisted uplink synchronization for inter-cell mobility. A UE may monitor for reference signals from a first, reference cell and a second, deactivated cell, and the UE may report a timing difference between a first timing advance of the first cell and a second timing advance of the second cell. In some cases, the UE may report a timing difference periodically, and, in other cases, the UE may report a timing difference aperiodically. Once a network entity receives the timing difference, the network entity may determine the second timing advance for the UE to use to communicate with the second cell. The network entity may then signal the second timing advance to the UE when the second cell is activated for communications with the UE, and the UE may use the second timing advance to communicate with the second cell.

A method for wireless communication at a user equipment (UE) is described. The method may include receiving an indication of a set of cells configured for communications with the UE, receiving a first reference signal from a first cell of the set of cells and a second reference signal from a second cell of the set of cells, where the first cell is activated and includes a reference cell, and the second cell is deactivated, and transmitting an indication of a timing difference between a first timing advance for communicating with the first cell and a second timing advance for communicating with the second cell.

An apparatus for wireless communication at a UE is described. The apparatus may include a processor, memory coupled with the processor, and instructions stored in the memory. The instructions may be executable by the processor to cause the apparatus to receive an indication of a set of cells configured for communications with the UE, receive a first reference signal from a first cell of the set of cells and a second reference signal from a second cell of the set of cells, where the first cell is activated and includes a reference cell, and the second cell is deactivated, and transmit an indication of a timing difference between a first timing advance for communicating with the first cell and a second timing advance for communicating with the second cell.

Another apparatus for wireless communication at a UE is described. The apparatus may include means for receiving an indication of a set of cells configured for communications with the UE, means for receiving a first reference signal from a first cell of the set of cells and a second reference signal from a second cell of the set of cells, where the first cell is activated and includes a reference cell, and the second cell is deactivated, and means for transmitting an indication of a timing difference between a first timing advance for communicating with the first cell and a second timing advance for communicating with the second cell.

A non-transitory computer-readable medium storing code for wireless communication at a UE is described. The code may include instructions executable by a processor to receive an indication of a set of cells configured for communications with the UE, receive a first reference signal from a first cell of the set of cells and a second reference signal from a second cell of the set of cells, where the first cell is activated and includes a reference cell, and the second cell is deactivated, and transmit an indication of a timing difference between a first timing advance for communicating with the first cell and a second timing advance for communicating with the second cell.

Some examples of the method, apparatuses, and non-transitory computer-readable medium described herein may further include operations, features, means, or instructions for receiving an indication that the second cell may be activated, receiving an indication of the second timing advance for communicating with the second cell based on transmitting the timing difference, and communicating with the second cell using the second timing advance.

In some examples of the method, apparatuses, and non-transitory computer-readable medium described herein, transmitting the indication of the timing difference may include operations, features, means, or instructions for transmitting a periodic transmission including the indication of the timing difference.

Some examples of the method, apparatuses, and non-transitory computer-readable medium described herein may further include operations, features, means, or instructions for receiving an indication of a periodicity for transmitting periodic transmissions including indications of timing differences.

In some examples of the method, apparatuses, and non-transitory computer-readable medium described herein, transmitting the indication of the timing difference may include operations, features, means, or instructions for transmitting an aperiodic transmission including the indication of the timing difference.

Some examples of the method, apparatuses, and non-transitory computer-readable medium described herein may further include operations, features, means, or instructions for identifying one or more triggering conditions for transmitting the timing difference, where transmitting the aperiodic transmission may be based on at least one of the one or more triggering conditions being satisfied.

In some examples of the method, apparatuses, and non-transitory computer-readable medium described herein, the one or more triggering conditions include the timing difference satisfying a timing difference threshold, a change in the reference cell, or a combination thereof.

Some examples of the method, apparatuses, and non-transitory computer-readable medium described herein may further include operations, features, means, or instructions for receiving an indication of the one or more triggering conditions for transmitting the timing difference.

Some examples of the method, apparatuses, and non-transitory computer-readable medium described herein may further include operations, features, means, or instructions for receiving a request to transmit the timing difference, where transmitting the aperiodic transmission may be based on receiving the request.

Some examples of the method, apparatuses, and non-transitory computer-readable medium described herein may further include operations, features, means, or instructions for transmitting a set of multiple timing differences between timing advances for communicating with the first cell and timing advances for communicating with the second cell, the set of multiple timing differences including the timing difference between the first timing advance and the second timing advance.

Some examples of the method, apparatuses, and non-transitory computer-readable medium described herein may further include operations, features, means, or instructions for receiving an indication that the first cell may be the reference cell, where the first cell may be selected as the reference cell based on cell quality, cell functionality, or a combination thereof.

Some examples of the method, apparatuses, and non-transitory computer-readable medium described herein may further include operations, features, means, or instructions for receiving an indication of a set of multiple configurations for the UE to use to transmit the timing difference and receiving a control message indicating a configuration of the set of multiple configurations for the UE to use to transmit the timing difference, where transmitting the indication of the timing difference may be based on the configuration.

In some examples of the method, apparatuses, and non-transitory computer-readable medium described herein, the timing difference between the first timing advance and the second timing advance may be based on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

In some examples of the method, apparatuses, and non-transitory computer-readable medium described herein, the indication of the timing difference may be transmitted in a medium access control control element or in a measurement report in uplink control information.

A method for wireless communication at a network entity is described. The method may include transmitting an indication of a set of cells configured for communications with a UE, transmitting a first reference signal via a first cell of the set of cells, where the first cell is activated and includes a reference cell, and the first cell is different from a second, deactivated cell, and receiving an indication of a timing difference between a first timing advance for communicating with the first cell and a second timing advance for communicating with the second cell.

An apparatus for wireless communication at a network entity is described. The apparatus may include a processor, memory coupled with the processor, and instructions stored in the memory. The instructions may be executable by the processor to cause the apparatus to transmit an indication of a set of cells configured for communications with a UE, transmit a first reference signal via a first cell of the set of cells, where the first cell is activated and includes a reference cell, and the first cell is different from a second, deactivated cell, and receive an indication of a timing difference between a first timing advance for communicating with the first cell and a second timing advance for communicating with the second cell.

Another apparatus for wireless communication at a network entity is described. The apparatus may include means for transmitting an indication of a set of cells configured for communications with a UE, means for transmitting a first reference signal via a first cell of the set of cells, where the first cell is activated and includes a reference cell, and the first cell is different from a second, deactivated cell, and means for receiving an indication of a timing difference between a first timing advance for communicating with the first cell and a second timing advance for communicating with the second cell.

A non-transitory computer-readable medium storing code for wireless communication at a network entity is described. The code may include instructions executable by a processor to transmit an indication of a set of cells configured for communications with a UE, transmit a first reference signal via a first cell of the set of cells, where the first cell is activated and includes a reference cell, and the first cell is different from a second, deactivated cell, and receive an indication of a timing difference between a first timing advance for communicating with the first cell and a second timing advance for communicating with the second cell.

Some examples of the method, apparatuses, and non-transitory computer-readable medium described herein may further include operations, features, means, or instructions for transmitting an indication that the second cell may be activated and transmitting an indication of the second timing advance for communicating with the second cell based on receiving the timing difference.

In some examples of the method, apparatuses, and non-transitory computer-readable medium described herein, receiving the indication of the timing difference may include operations, features, means, or instructions for receiving a periodic transmission including the indication of the timing difference.

Some examples of the method, apparatuses, and non-transitory computer-readable medium described herein may further include operations, features, means, or instructions for transmitting an indication of a periodicity for periodic transmissions from the UE including indications of timing differences.

In some examples of the method, apparatuses, and non-transitory computer-readable medium described herein, receiving the indication of the timing difference may include operations, features, means, or instructions for receiving an aperiodic transmission including the indication of the timing difference.

Some examples of the method, apparatuses, and non-transitory computer-readable medium described herein may further include operations, features, means, or instructions for transmitting an indication of one or more triggering conditions for the UE to transmit the timing difference, where receiving the aperiodic transmission may be based on at least one of the one or more triggering conditions being satisfied.

In some examples of the method, apparatuses, and non-transitory computer-readable medium described herein, the one or more triggering conditions includes the timing difference satisfying a timing difference threshold, a change in the reference cell, or a combination thereof.

Some examples of the method, apparatuses, and non-transitory computer-readable medium described herein may further include operations, features, means, or instructions for transmitting a request for the UE to transmit the timing difference, where receiving the aperiodic transmission may be based on transmitting the request.

Some examples of the method, apparatuses, and non-transitory computer-readable medium described herein may further include operations, features, means, or instructions for receiving a set of multiple timing differences between timing advances for communicating with the first cell and timing advances for communicating with the second cell, the set of multiple timing differences including the timing difference between the first timing advance and the second timing advance.

Some examples of the method, apparatuses, and non-transitory computer-readable medium described herein may further include operations, features, means, or instructions for transmitting an indication that the first cell may be the reference cell, where the first cell may be selected as the reference cell based on cell quality, cell functionality, or a combination thereof.

Some examples of the method, apparatuses, and non-transitory computer-readable medium described herein may further include operations, features, means, or instructions for transmitting an indication of a set of multiple configurations for the UE to use to transmit the timing difference and transmitting a control message indicating a configuration of the set of multiple configurations for the UE to use to transmit the timing difference, where receiving the indication of the timing difference may be based on the configuration.

In some examples of the method, apparatuses, and non-transitory computer-readable medium described herein, the timing difference between the first timing advance and the second timing advance may be based on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

In some examples of the method, apparatuses, and non-transitory computer-readable medium described herein, the indication of the timing difference may be received in a medium access control control element or in a measurement report in uplink control information.

BRIEF DESCRIPTION OF THE DRAWINGS

FIGS. 13 and 14 show flowcharts illustrating methods that support UE assisted uplink synchronization for inter-cell mobility in accordance with one or more aspects of the present disclosure.

DETAILED DESCRIPTION

In some wireless communications systems, a network entity may configure a set of cells for communications with a user equipment (UE). The configured set of cells may include activated cells and deactivated cells. A UE may communicate with the activated cells in the configured set of cells, and the deactivated cells may be subsequently activated for communications with the UE. A network entity may use dynamic signaling (e.g., layer one (L1) or layer two (L2) signaling) to activate and deactivate cells in the configured set of cells to allow a UE to communicate with different subsets of the configured set of cells.

Once a cell is activated, a UE may perform a random access channel (RACH) procedure to synchronize timing with the cell, and the UE may communicate with the cell after uplink synchronization. For instance, the UE may identify a timing advance for communicating with the cell in the RACH procedure, and the UE may communicate with the cell using the timing advance. In some cases, however, by performing a RACH procedure, a UE may experience increased latency and power consumption when a cell is activated for communications with the UE. This latency and power consumption may negate the benefits of dynamic activation of cells, which may be detrimental to a wireless communications system.

As described herein, a wireless communications system may support efficient techniques for facilitating uplink synchronization at a UE with a cell once the cell is activated for communications with the UE. A UE may monitor for reference signals from a first, reference cell and a second, deactivated cell, and the UE may report a timing difference between a first timing advance of the first cell and a second timing advance of the second cell. In some cases, the UE may report a timing difference periodically, and, in other cases, the UE may report a timing difference aperiodically (e.g., in response to a request or based on one or more triggering conditions being satisfied). Once a network entity receives the timing difference, the network entity may determine the second timing advance for the UE to use to communicate with the second cell. The network entity may then signal the second timing advance to the UE when the second cell is activated for communications with the UE, and the UE may use the second timing advance to communicate with the second cell.

Aspects of the disclosure are initially described in the context of wireless communications systems. Aspects of the disclosure are further illustrated by and described with reference to apparatus diagrams, system diagrams, and flowcharts that relate to UE assisted uplink synchronization for inter-cell mobility.

Figure 1:
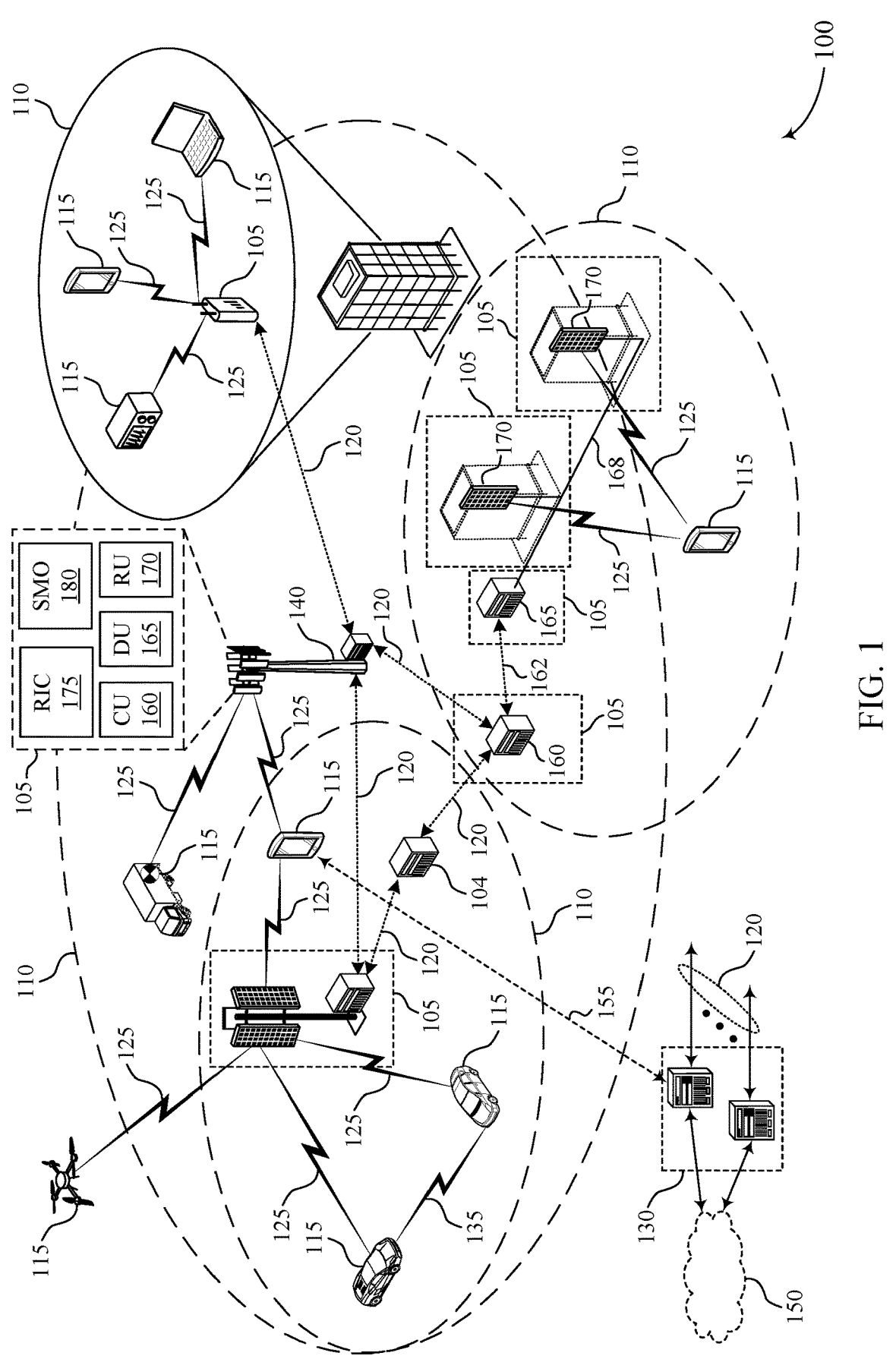
FIG. 1 illustrates an example of a wireless communications system that supports user equipment (UE) assisted uplink synchronization for inter-cell mobility in accordance with one or more aspects of the present disclosure.

FIG. 1 illustrates an example of a wireless communications system 100 that supports UE assisted uplink synchronization for inter-cell mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support cell management for inter-cell mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink shared channel (PDSCH) or a physical downlink control channel (PDCCH)), uplink transmissions (e.g., return link transmissions) from a UE 115 to a network entity 105 (e.g., in a physical uplink shared channel (PUSCH) or a physical uplink control channel (PUCCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells (e.g., with one or more UEs 115) using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices. A UE 115 may be configured with a primary cell (PCell) and one or more secondary cells (SCells) with which to communicate. For instance, the UE 115 may communicate with the PCell and the one or more SCells if the UE 115 is configured for dual connectivity (DC) or carrier aggregation (CA). The UE 115 may use the PCell for initial access to a network (e.g., initial access to a master cell group (MCG)) and other communications, and the UE 115 may use the one or more SCells for supplementary communications. In some cases, the UE 115 may be configured with a primary secondary cell (PSCell) that the UE 115 may use for initial access to one or more SCells (e.g., initial access to a secondary cell group (SCG)). A PCell or a PSCell (primary cell of an SCG) may be referred to as a special cell (SpCell). An SpCell configuration for an MCG may correspond to a PCell configuration, and an SpCell configuration for an SCG may correspond to a PSCell configuration.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In wireless communications system 100, a network entity 105 may configure a set of cells for communications with a UE 115. The network entity 105 may be connected to or support communications via at least one cell of the set of cells, and the network entity 105 may configure the UE 115 with the set of cells via the at least one cell. The configured set of cells may include activated cells and deactivated cells. A UE 115 may communicate with the activated cells in the configured set of cells, and the deactivated cells may be subsequently activated for communications with the UE 115 (e.g., when appropriate). A network entity 105 may use dynamic signaling (e.g., L1 or L2 signaling, such as downlink control information (DCI) messages or MAC control elements (MAC-CEs)) to activate and deactivate cells in the configured set of cells to maximize throughput (e.g., by allowing a UE 115 to communicate with an optimal subset of the configured set of cells). The use of dynamic signaling to activate and deactivate cells in a configured set of cells may be referred to as L1/L2-based inter-cell mobility.

The wireless communications system 100 may support techniques for L1/L2-based inter-cell mobility. For instance, the wireless communications system 100 may support the configuration and maintenance of multiple candidate cells in a configured set of cells to allow fast application of configurations for the candidate cells. Further, the wireless communications system 100 may support a dynamic switching mechanism among candidate serving cells (e.g., including an SpCell and an SCell) for potential applicable scenarios based on L1/L2 signaling. The wireless communications system 100 may also support L1 enhancements for inter-cell beam management, including L1 measurements and reporting and beam indication. The wireless communications system 100 may also support timing advance management and CU-DU interface signaling to support L1/L2 mobility (e.g., if appropriate). In some examples, frequency range two (FR2) specific enhancements may not be precluded (e.g., if any).

In addition, the described techniques may provide for the design and enhancement of L1/L2-based inter-cell mobility. A procedure for L1/L2-based inter-cell mobility may be applicable in multiple scenarios. In one example, L1/L2-based inter-cell mobility may be used for standalone, CA, or NR-DC cases supporting a serving cell change within a configured grant. In another example, L1/L2-based inter-cell mobility may be used for an intra-DU case or an intra-CU and inter-DU case (e.g., applicable for standalone and CA, where no new RAN interfaces may be expected). In yet another example, L1/L2-based inter-cell mobility may be used for both intra-frequency and inter-frequency communications. In yet another example, L1/L2-based inter-cell mobility may be used for communications in both a frequency range one (FR1) and a frequency range two (FR2). In yet another example, L1/L2-based inter-cell mobility may be used for communications with source and target cells that may be synchronized or non-synchronized.

Figure 2:
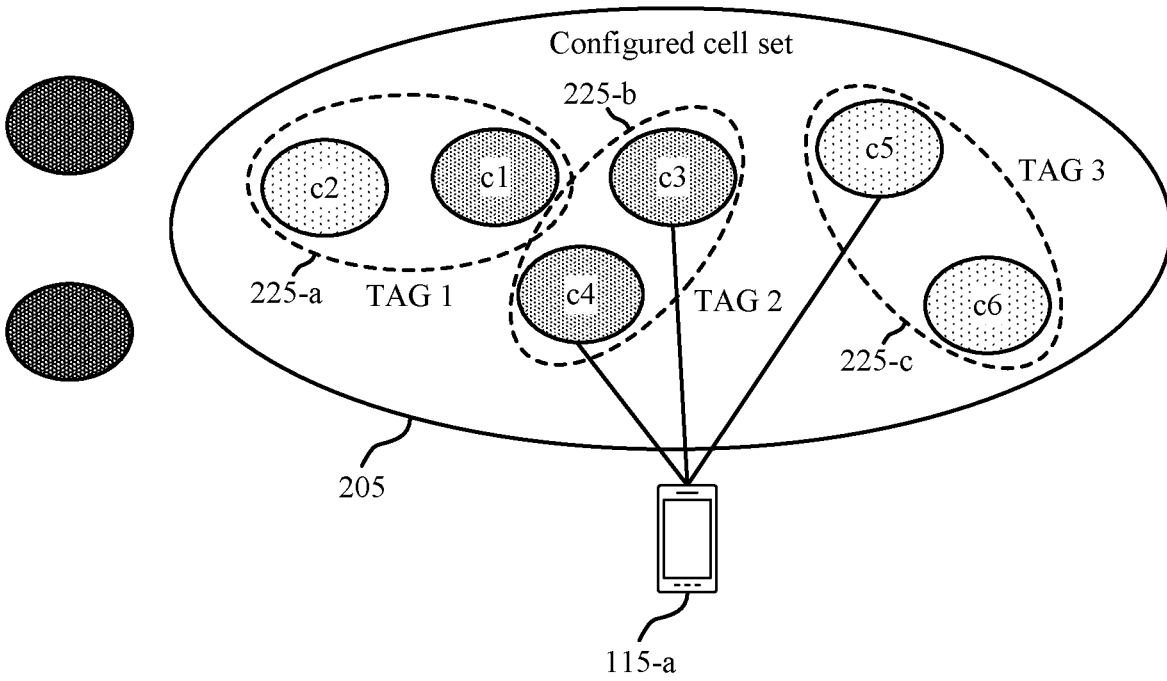
FIG. 2 illustrates an example of inter-cell mobility in accordance with one or more aspects of the present disclosure.
Figure 2:
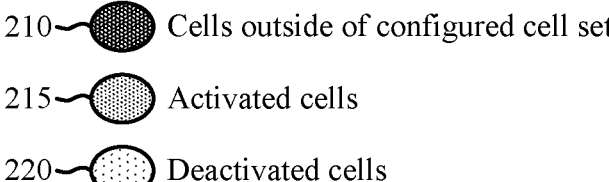

FIG. 2 illustrates an example of inter-cell mobility 200 in accordance with one or more aspects of the present disclosure. A UE 115-a may be configured with a set of cells (e.g., configured cell set 205) for inter-cell mobility (e.g., L1/L2 mobility). A network entity 105 may use RRC signaling to configure the set of cells. In some examples, there may be one or more cells 210 outside of the configured cell set 205. Cells in the configured cell set 205 may be further characterized into activated cells 215 and deactivated cells 220 (e.g., including an SpCell and SCells). An activated cell set may correspond to a group of cells that can be readily used for data and control information transfer. For example, for cells in the activated cell set, control channels may be monitored, synchronization may be maintained, or a timing advance may be maintained. A deactivated cell set may correspond to a group of cells that are not activated but can be quickly activated by L1/L2 signaling. For example, for deactivated cells, a control channel may not be monitored, synchronization may not be maintained, or a timing advance may not be maintained. The UE 115-*a* may perform measurements (e.g., periodically according to a configuration) on the cells in the configured cell set 205 for fast L1/L2 mobility handover. Cells in the configured cell set 205 may belong to (e.g., be supported or used for communications by) a same network entity 105 (e.g., DU) or different network entities 105 (e.g., DUs). The configured cell set 205 may be large enough to cover reasonable mobility areas, and mobility within the configured cell set may be done through L1/L2 signaling.

In an inter-cell mobility scenario, cells in the configured cell set 205 may not be collocated, and the UE 115-*a* may experience different propagation delays to different cells. As such, different timing information may be used or necessary based on a timing advance group (TAG) allocation of a cell. A TAG may refer to a group of cells with which a UE 115 may communicate using the same timing information (e.g., a same timing advance). The configured cell set 205 may include cells in multiple TAGs 225, including a first TAG 225-*a*, a second TAG 225-*b*, and a third TAG 225-*c*.

The UE 115-*a* may obtain initial timing advance information for a cell via a RACH procedure. For an SpCell, the UE 115-*a* may initiate a RACH procedure to obtain timing advance information. For an SCell, the UE 115-*a* may perform a PDCCH ordered RACH procedure to obtain timing advance information. After an initial timing advance information acquisition, one or more cells may be deactivated in the configured cell set 205. In some cases, however, the UE 115-*a* may not be configured to perform measurements for deactivated cells 220. Thus, at the time of cell activation, the UE 115-*a* may perform a RACH procedure again to obtain timing advance information, and, by performing the RACH procedure, the UE 115-*a* may experience increased latency and power consumption. This latency and power consumption may negate the benefits of dynamic activation of cells, which may be detrimental to a wireless communications system.

The wireless communications system 100 may support efficient techniques for facilitating uplink synchronization at the UE 115-*a* with a cell once the cell is activated for communications with the UE 115-*a*. For instance, the described techniques may allow for maintaining timing advance information for deactivated cells in the configured cell set 205 such that the timing advance information may be directly signaled to the UE 115-*a* at the time of cell activation. As such, the UE 115-*a* may avoid a RACH procedure at the time of cell activation, resulting in reduced latency and power consumption. Further, the described techniques may allow for fast L1 or L2 signaling to facilitate seamless UE mobility within the configured cell set 205.

Figure 3:
FIG. 3 illustrates an example of a wireless communications system that supports UE assisted uplink synchronization for inter-cell mobility in accordance with one or more aspects of the present disclosure.

FIG. 3 illustrates an example of a wireless communications system 300 that supports UE assisted uplink synchronization for inter-cell mobility in accordance with one or more aspects of the present disclosure. The wireless communications system 300 includes a UE 115-*b*, which may be an example of a UE 115 described with reference to FIGS. 1 and 2. The wireless communications system 300 also includes a cell 105-*a*, a cell 105-*b*, and a cell 105-*c*, which may be an example of a network entity 105 or a cell described with reference to FIGS. 1 and 2. The wireless communications system 300 may implement aspects of the wireless communications system 100. For instance, the wireless communications system 300 may support efficient techniques for facilitating uplink synchronization at the UE 115-*b* with a cell once the cell is activated for communications with the UE 115-*b*.

The first cell 105-*a* may be activated for communications with the UE 115-*b* and may be a reference cell for timing advance maintenance (e.g., based on UE assistance). The reference cell may be a SpCell or a synchronized SCell. The second cell 105-*b* and the third cell 105-*c* may be SCells and may be deactivated for communications with the UE 115-*b*. The timing advance information of the second cell 105-*b* and the third cell 105-*c* (e.g., deactivated SCells) may be estimated based on downlink reference signal measurements. The first cell 105-*a*, the second cell 105-*b*, and the third cell 105-*c* may transmit reference signals 305 which may be received by the UE 115-*b*. The reference signals 305 may be synchronization signal blocks (SSBs) or channel state information (CSI) reference signals (CSI-RSs). In some cases, the reference signals 305 may include existing reference signals used for L1 measurements for an L1 or L2 mobility cell set. Because the second cell 105-*b* and the third cell 105-*c* may be in a same TAG, the UE 115-*b* may monitor for the reference signals 305 from the second cell 105-*b* and avoid monitoring for the reference signals 305 from the third cell 105-*c*. For instance, only one cell per TAG may be monitored for timing advance information.

The UE 115-*b* may estimate a first timing advance for communicating with the first cell 105-*a*, and the UE 115-*b* may estimate a second timing advance for communicating with the second cell 105-*b*. The UE 115-*b* may determine a timing difference 310 between the first timing advance and the second timing advance. In some examples, the UE 115-*b* may estimate a received reference signal timing difference between the reference signals 305 received from the second cell 105-*b* and the reference signals 305 received from the first cell 105-*a* (e.g., with respect to the reference cell), and the UE 115-*b* may determine the timing difference 310 based on the received reference signal timing difference. In some examples, the UE 115-*b* may estimate a downlink propagation delay difference between a first downlink propagation delay for receiving the reference signals 305 from the first cell 105-*a* and a second propagation delay for receiving the reference signals 305 from the second cell 105-*b*, and the UE 115-*b* may determine the timing difference 310 based on the downlink propagation delay difference.

Once the UE 115-*b* determines the timing difference 310, the UE 115-*b* may report the timing difference 310 to a network entity 105 (e.g., via the first cell 105-*a*). The timing difference 310 may be based on a downlink timing difference or a downlink propagation delay difference. The network entity 105 may then use the timing difference, or downlink propagation delay difference, to determine a timing advance for the UE 115-*b* to use to communicate with the second cell 105-*b* (e.g., once the second cell 105-*b* is activated).

The UE 115-*b* may report to the network entity 105 regarding the timing difference 310, and the report may include a current timing difference (e.g., the timing difference 310) and a timing difference history including past timing differences (e.g., timing differences in the past x ms if the report is not sent periodically). In some examples, the UE 115-b may transmit the timing difference 310 in a dedicated MAC-CE or in joint signaling with an L1 measurement report. If the UE 115-b transmits the timing difference 310 in the joint signaling, the measurement objects (e.g., the reference signals 305) may be SSBs or CSI-RSs, and the UE 115-b may be configured to indicate the timing difference in the measurement report. For instance, the measurement report may include a field to indicate the timing difference 310 (e.g., a downlink propagation delay or downlink propagation delay difference).

In some aspects, the UE 115-b may transmit timing differences periodically (e.g., with a configured signaling periodicity) or aperiodically. In one example, the UE 115-b may transmit the timing differences periodically or aperiodically in dedicated or separate signaling (e.g., a dedicated MAC-CE) or in joint signaling with an L1 measurement report. In this example, a network entity 105 may indicate a periodicity with which the UE 115-b may transmit the timing differences (e.g., periodic with network configured periodicity f). Additionally, or alternatively, a network entity 105 may indicate triggering conditions for transmitting the timing differences aperiodically. The triggering conditions may include a timing difference satisfying a threshold or a change in a reference cell. If the UE 115-b is configured to transmit the timing differences in joint signaling with an L1 measurement report, one or more of the triggering conditions may be included in a measurement report configuration for the L1 measurement report. Further, in some cases, a triggering condition (e.g., triggering event) may be added to a measurement report triggering list. In another example, the UE 115-b may transmit a timing difference in response to a request from a network entity 105.

In an example of a triggering event configuration, a triggering event (e.g., event A7) may be defined for a timing difference between the first cell 105-a (e.g., a reference cell) and the second cell 105-b satisfying a threshold. The UE 115-b may consider an entering condition for this triggering event to be satisfied when a first condition (e.g., condition A7-1) is satisfied. The first condition (e.g., inequality A7-1 or the entering condition) may be: Abs(Ms−Ref)>threshold, where Ms is a measurement result (e.g., first timing advance) of the second cell 105-b (e.g., a serving cell) and Ref is a measurement result (e.g., second timing advance) of the first cell 105-a (e.g., a reference cell). The UE 115-b may consider a leaving condition for this triggering event to be satisfied when a second condition (e.g., condition A7-2) is satisfied. The second condition (e.g., inequality A7-1 or the leaving condition) may be: Abs(Ms−Ref)>threshold, where Ms is a measurement result (e.g., first timing advance) of the second cell 105-b (e.g., a serving cell) and Ref is a measurement result (e.g., second timing advance) of the first cell 105-a (e.g., a reference cell). The UE 115-b may also, for a measurement of a timing difference, consider the second cell 105-b (e.g., the serving cell) indicated by a measurement object associated with the triggering event.

In some aspects, the UE 115-b may receive, from a network entity 105, an indication of one or more configurations (e.g., in an RRC configuration message) for transmitting timing differences to the network entity 105 (e.g., via the first cell 105-a). A configuration for transmitting timing differences may indicate a reference cell for calculating timing differences (e.g., an SpCell or other synchronized SCells). In some cases, a network entity 105 may configure multiple reference cells. Additionally, or alternatively, a configuration for transmitting timing differences may include a timing difference reporting periodicity f, a timing difference aperiodic reporting triggering condition, or an indication of timing difference report content and related parameters (e.g., a timing difference reporting time window (x ms) for reporting past timing differences in aperiodic reporting). If the UE 115-b receives an indication of multiple configurations for transmitting timing differences to the network entity 105, the UE 115-b may receive an indication of a configuration of the multiple configurations to use for transmitting a timing difference or multiple timing differences (e.g., a network entity 105 may use DCI or a MAC-CE to switch configurations).

Figure 4:
FIG. 4 illustrates an example of a process flow that supports UE assisted uplink synchronization for inter-cell mobility in accordance with one or more aspects of the present disclosure.

FIG. 4 illustrates an example of a process flow 400 that supports UE assisted uplink synchronization for inter-cell mobility in accordance with one or more aspects of the present disclosure. The process flow 400 includes a UE 115-c, which may be an example of a UE 115 described with reference to FIGS. 1-3. The process flow 400 also includes a cell 105-d and a cell 105-e, which may be examples of network entities 105 or cells described with reference to FIGS. 1-3. The process flow 400 may implement aspects of the wireless communications system 100 or the wireless communications system 300. For instance, the process flow 400 may support efficient techniques for facilitating uplink synchronization at the UE 115-c with a cell once the cell is activated for communications with the UE 115-c.

In the following description of the process flow 400, the signaling exchanged between the UE 115-c, the cell 105-d, and the cell 105-e may be exchanged in a different order than the example order shown, or the operations performed by the UE 115-c, the cell 105-d, and the cell 105-e may be performed in different orders or at different times. Some operations may also be omitted from the process flow 400, and other operations may be added to the process flow 400.

As described herein, satisfying a threshold may, depending on the context, refer to a value being greater than the threshold, greater than or equal to the threshold, less than the threshold, less than or equal to the threshold, equal to the threshold, not equal to the threshold, or the like.

At 405, a network entity 105 may transmit a higher layer control message (e.g., an RRC configuration message) to a UE 115-c via a first cell 105-d, and the UE 115-c may receive the higher layer control message. The higher layer control message may include a configuration of a set of cells with which the UE 115-c may communicate, and the set of cells may include the first cell 105-d and a second cell 105-e. The first cell 105-d may be activated, and the second cell 105-e may be deactivated. In some examples, after receiving the higher layer control message (e.g., the RRC configuration message), the UE 115-c may transmit an acknowledgment to the network entity 105 (e.g., an RRC configuration or reconfiguration complete message).

At 410, the UE 115-c may receive a first reference signal from the first cell 105-d, and, at 415, the UE 115-c may receive a second reference signal from the second cell 105-e. At 420, the UE 115-c may transmit an indication of a timing difference between a first timing advance for communicating with the first cell 105-d and a second timing advance for communicating with the second cell 105-e (e.g., a timing difference with respect to a reference cell). The UE 115-c may transmit the indication of the timing difference in a MAC-CE or in a measurement report in uplink control information.

The UE 115-c may determine that the first cell 105-d is a reference cell, and the UE 115-c may transmit the indication of the timing difference between the first timing advance and the second timing advance based on determining that the first cell 105-*d* is the reference cell. In some examples, the UE 115-*c* may receive an indication from a network entity 105 (e.g., via the first cell 105-*d*) that the first cell 105-*d* is the reference cell. The network entity 105 may select the first cell as the reference cell based on a cell quality of the first cell 105-*d* (e.g., a reference signal received power (RSRP), a pathloss, or a signal-to-interference-plus-noise ratio (SINR) associated with communications between the first cell 105-*d* and the UE 115-*c*) or a cell functionality of the first cell 105-*d* (e.g., always selecting an SpCell as the reference cell).

In some examples, the UE 115-*c* may transmit the indication of the timing difference in a periodic transmission. The UE 115-*c* may receive an indication of a periodicity for transmitting periodic transmissions with indications of timing differences. In other examples, the UE 115-*c* may transmit the indication of the timing difference in an aperiodic transmission (e.g., a single, standalone transmission). The UE 115-*c* may identify one or more triggering conditions for transmitting the timing difference, and the UE 115-*c* may transmit the aperiodic transmission with the timing difference if at least one of the triggering conditions is satisfied. The triggering conditions may include the timing difference satisfying a timing difference threshold or a change in a reference cell. The UE 115-*c* may receive an indication of the triggering conditions for transmitting the timing difference. In some examples, the UE 115-*c* may receive a request to transmit the timing difference, and the UE 115-*c* may transmit the aperiodic transmission with the timing difference in response to receiving the request.

In some examples, the UE 115-*c* may transmit multiple timing differences (e.g., for aperiodic reporting of timing advances) between timing advances for communicating with the first cell 105-*d* and timing advances for communicating with the second cell 105-*e*. The multiple timing differences may include the timing difference between the first timing advance for communicating with the first cell 105-*d* and the second timing advance for communicating with the second cell 105-*e*. The multiple timing differences may also include past timing differences between timing advances for communicating with the first cell 105-*d* and timing advances for communicating with the second cell 105-*e* (e.g., a history record of downlink timing differences with respect to the reference cell). The past timing differences may include the timing differences determined within a threshold amount of time (e.g., x ms), or the past timing differences may include a threshold quantity of past timing differences.

In some examples, the UE 115-*c* may receive an indication of multiple configurations to use to transmit the timing difference. The UE 115-*c* may then receive (e.g., in a lower layer control message) an indication of a configuration of the multiple configurations for the UE 115-*c* to use to transmit the timing difference, and the UE 115-*c* may transmit the timing difference using the configuration. The timing difference between the first timing advance and the second timing advance may be based on a downlink propagation delay difference between a first propagation delay associated with the first cell 105-*d* and a second downlink propagation delay associated with the second cell 105-*e*. Additionally, or alternatively, the timing difference between the first timing advance and the second timing advance may be based on a difference between a first downlink signal reception time associated with the first cell 105-*d* (e.g., a reception time of the reference signal at 410) and a second downlink signal reception time associated with the second cell 105-*e* (e.g., a reception time of the reference signal at 415).

At 425, the UE 115-*c* may receive a lower layer control message (e.g., used for L1/L2 mobility) from the first cell 105-*d* indicating that the second cell 105-*e* is activated. The lower layer control message may also indicate the second timing advance for communicating with the second cell 105-*e*. A network entity 105 may determine the second timing advance based on the timing difference between the first timing advance and the second timing advance received from the UE 115-*c*. At 430, the UE 115-*c* may communicate (e.g., exchange control information and data) with the second cell 105-*e* using the second timing advance.

Figure 5:
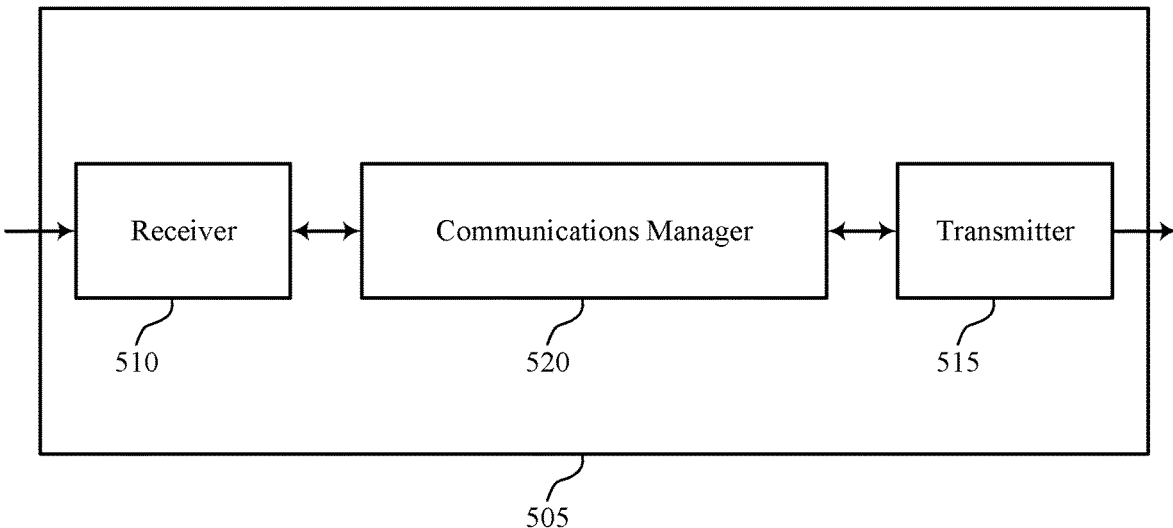
FIGS. 5 and 6 show block diagrams of devices that support UE assisted uplink synchronization for inter-cell mobility in accordance with one or more aspects of the present disclosure.
Figure 5:

FIG. 5 shows a block diagram 500 of a device 505 that supports UE assisted uplink synchronization for inter-cell mobility in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE assisted uplink synchronization for inter-cell mobility). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE assisted uplink synchronization for inter-cell mobility). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE assisted uplink synchronization for inter-cell mobility as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving an indication of a set of cells configured for communications with the UE. The communications manager 520 may be configured as or otherwise support a means for receiving a first reference signal from a first cell of the set of cells and a second reference signal from a second cell of the set of cells, where the first cell is activated and includes a reference cell, and the second cell is deactivated. The communications manager 520 may be configured as or otherwise support a means for transmitting an indication of a timing difference between a first timing advance for communicating with the first cell and a second timing advance for communicating with the second cell.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources. Because the device 505 may continue to monitor for and perform measurements on reference signals from a cell that is deactivated and report timing differences between the timing advances for communicating with the cell and timing differences for communicating with a reference cell, a network entity 105 may maintain a timing advance for the device 505 to use to communicate with the cell. Thus, when the cell is activated, the network entity 105 may signal the timing advance for the device 505 to use to communicate with the cell, and the device 505 may avoid performing a RACH procedure to identify the timing advance (e.g., resulting in the reduced processing, reduced power consumption, and more efficient utilization of communication resources).

Figure 6:
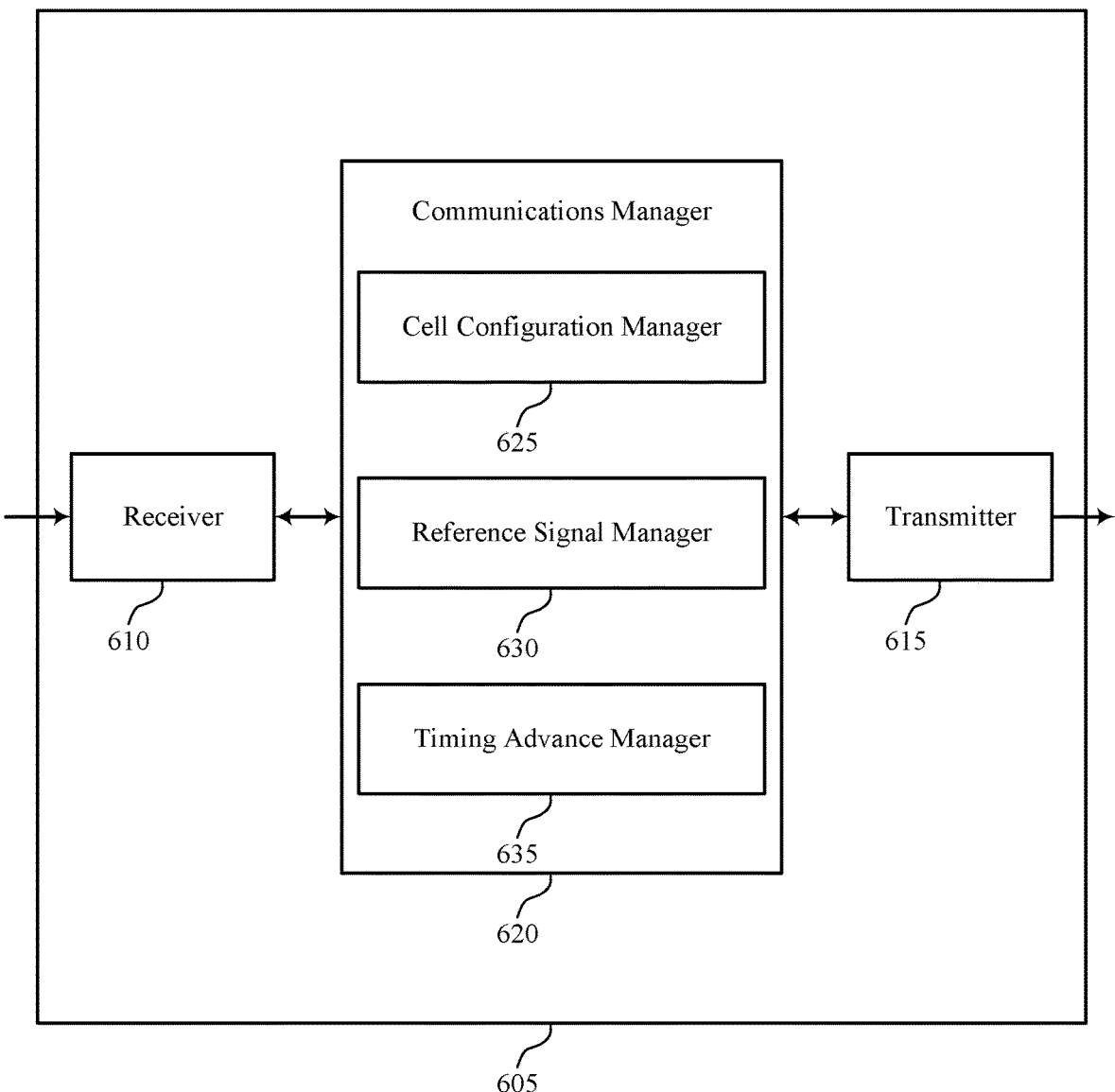

FIG. 6 shows a block diagram 600 of a device 605 that supports UE assisted uplink synchronization for inter-cell mobility in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE assisted uplink synchronization for inter-cell mobility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE assisted uplink synchronization for inter-cell mobility). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE assisted uplink synchronization for inter-cell mobility as described herein. For example, the communications manager 620 may include a cell configuration manager 625, a reference signal manager 630, a timing advance manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The cell configuration manager 625 may be configured as or otherwise support a means for receiving an indication of a set of cells configured for communications with the UE. The reference signal manager 630 may be configured as or otherwise support a means for receiving a first reference signal from a first cell of the set of cells and a second reference signal from a second cell of the set of cells, where the first cell is activated and includes a reference cell, and the second cell is deactivated. The timing advance manager 635 may be configured as or otherwise support a means for transmitting an indication of a timing difference between a first timing advance for communicating with the first cell and a second timing advance for communicating with the second cell.

Figure 7:
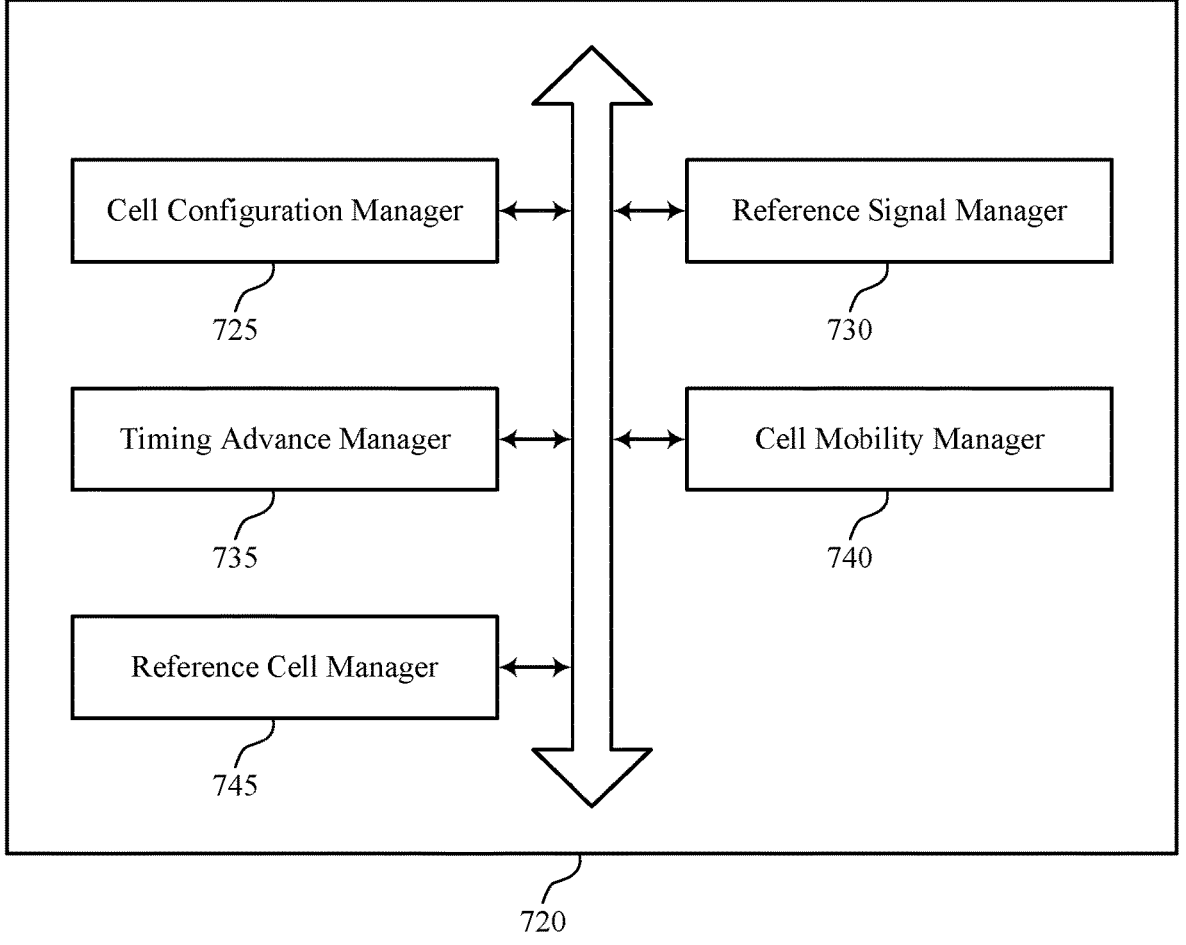
FIG. 7 shows a block diagram of a communications manager that supports UE assisted uplink synchronization for inter-cell mobility in accordance with one or more aspects of the present disclosure.

FIG. 7 shows a block diagram 700 of a communications manager 720 that supports UE assisted uplink synchronization for inter-cell mobility in accordance with one or more aspects of the present disclosure. The communications manager 720 may be an example of aspects of a communications manager 520, a communications manager 620, or both, as described herein. The communications manager 720, or various components thereof, may be an example of means for performing various aspects of UE assisted uplink synchronization for inter-cell mobility as described herein. For example, the communications manager 720 may include a cell configuration manager 725, a reference signal manager 730, a timing advance manager 735, a cell mobility manager 740, a reference cell manager 745, or any combination thereof. Each of these components may communicate, directly or indirectly, with one another (e.g., via one or more buses).

The communications manager 720 may support wireless communication at a UE in accordance with examples as disclosed herein. The cell configuration manager 725 may be configured as or otherwise support a means for receiving an indication of a set of cells configured for communications with the UE. The reference signal manager 730 may be configured as or otherwise support a means for receiving a first reference signal from a first cell of the set of cells and a second reference signal from a second cell of the set of cells, where the first cell is activated and includes a reference cell, and the second cell is deactivated. The timing advance manager 735 may be configured as or otherwise support a means for transmitting an indication of a timing difference between a first timing advance for communicating with the first cell and a second timing advance for communicating with the second cell.

In some examples, the cell mobility manager 740 may be configured as or otherwise support a means for receiving an indication that the second cell is activated. In some examples, the timing advance manager 735 may be configured as or otherwise support a means for receiving an indication of the second timing advance for communicating with the second cell based on transmitting the timing difference. In some examples, the timing advance manager 735 may be configured as or otherwise support a means for communicating with the second cell using the second timing advance.

In some examples, to support transmitting the indication of the timing difference, the timing advance manager 735 may be configured as or otherwise support a means for transmitting a periodic transmission including the indication of the timing difference.

In some examples, the timing advance manager 735 may be configured as or otherwise support a means for receiving an indication of a periodicity for transmitting periodic transmissions including indications of timing differences.

In some examples, to support transmitting the indication of the timing difference, the timing advance manager 735 may be configured as or otherwise support a means for transmitting an aperiodic transmission including the indication of the timing difference.

In some examples, the timing advance manager 735 may be configured as or otherwise support a means for identifying one or more triggering conditions for transmitting the timing difference, where transmitting the aperiodic transmission is based on at least one of the one or more triggering conditions being satisfied.

In some examples, the one or more triggering conditions include the timing difference satisfying a timing difference threshold, a change in the reference cell, or a combination thereof.

In some examples, the timing advance manager 735 may be configured as or otherwise support a means for receiving an indication of the one or more triggering conditions for transmitting the timing difference.

In some examples, the timing advance manager 735 may be configured as or otherwise support a means for receiving a request to transmit the timing difference, where transmitting the aperiodic transmission is based on receiving the request.

In some examples, the timing advance manager 735 may be configured as or otherwise support a means for transmitting a set of multiple timing differences between timing advances for communicating with the first cell and timing advances for communicating with the second cell, the set of multiple timing differences including the timing difference between the first timing advance and the second timing advance.

In some examples, the reference cell manager 745 may be configured as or otherwise support a means for receiving an indication that the first cell is the reference cell, where the first cell is selected as the reference cell based on cell quality, cell functionality, or a combination thereof.

In some examples, the timing advance manager 735 may be configured as or otherwise support a means for receiving an indication of a set of multiple configurations for the UE to use to transmit the timing difference. In some examples, the timing advance manager 735 may be configured as or otherwise support a means for receiving a control message indicating a configuration of the set of multiple configurations for the UE to use to transmit the timing difference, where transmitting the indication of the timing difference is based on the configuration.

In some examples, the timing difference between the first timing advance and the second timing advance is based on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

In some examples, the indication of the timing difference is transmitted in a medium access control control element or in a measurement report in uplink control information.

Figure 8:
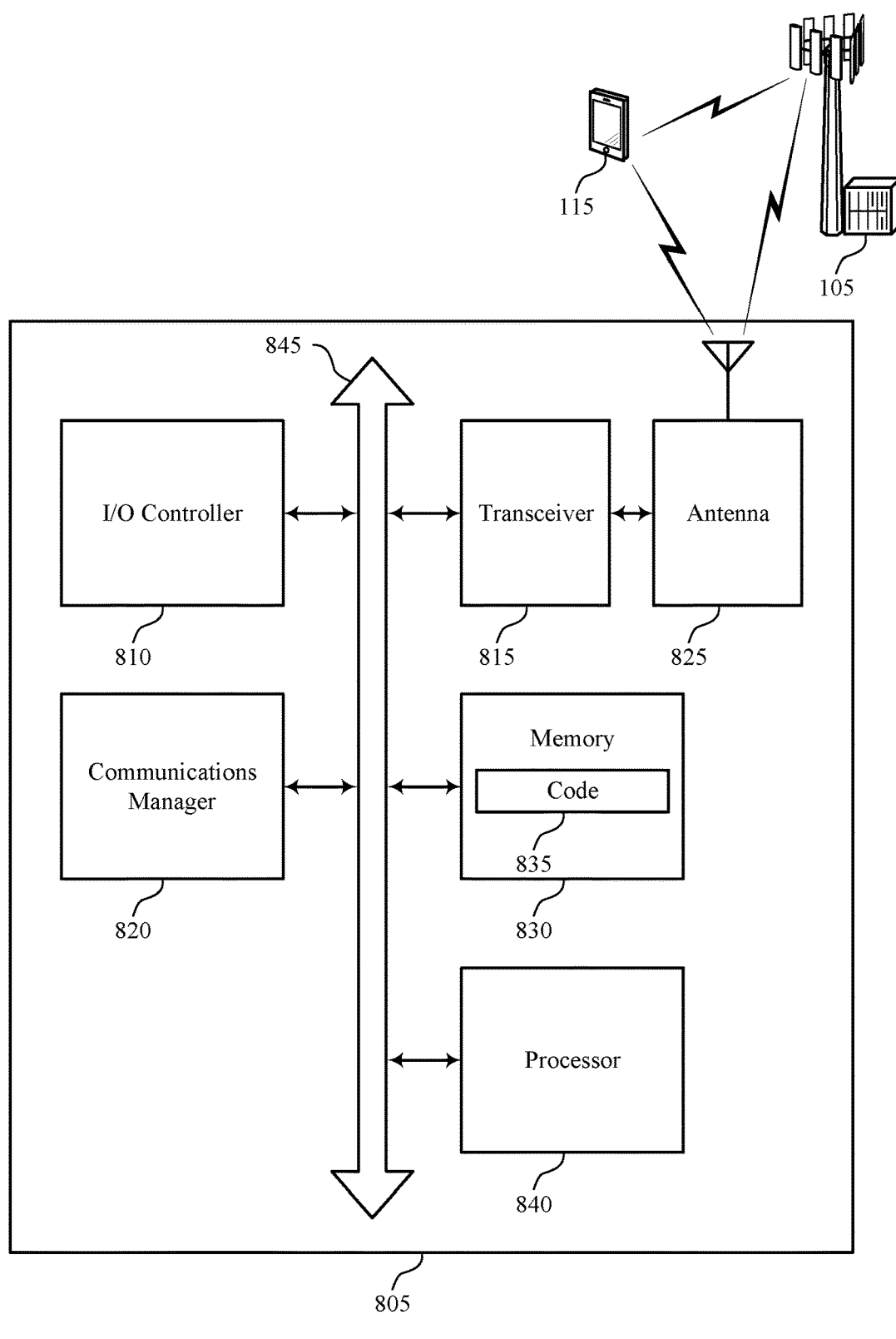
FIG. 8 shows a diagram of a system including a device that supports UE assisted uplink synchronization for inter-cell mobility in accordance with one or more aspects of the present disclosure.

FIG. 8 shows a diagram of a system 800 including a device 805 that supports UE assisted uplink synchronization for inter-cell mobility in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting UE assisted uplink synchronization for inter-cell mobility). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving an indication of a set of cells configured for communications with the UE. The communications manager 820 may be configured as or otherwise support a means for receiving a first reference signal from a first cell of the set of cells and a second reference signal from a second cell of the set of cells, where the first cell is activated and includes a reference cell, and the second cell is deactivated. The communications manager 820 may be configured as or otherwise support a means for transmitting an indication of a timing difference between a first timing advance for communicating with the first cell and a second timing advance for communicating with the second cell.

By including or configuring the communications manager 820 in accordance with examples as described herein, the device 805 may support techniques for reduced processing, reduced power consumption, and more efficient utilization of communication resources. Because the device 805 may continue to monitor for and perform measurements on reference signals from a cell that is deactivated and report timing differences between the timing advances for communicating with the cell and timing differences for communicating with a reference cell, a network entity 105 may maintain a timing advance for the device 805 to use to communicate with the cell. Thus, when the cell is activated, the network entity 105 may signal the timing advance for the device 805 to use to communicate with the cell, and the device 805 may avoid performing a RACH procedure to identify the timing advance (e.g., resulting in the reduced processing, reduced power consumption, and more efficient utilization of communication resources).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of UE assisted uplink synchronization for inter-cell mobility as described herein, or the processor 840 and the memory 830 may be otherwise configured to perform or support such operations.

Figure 9:
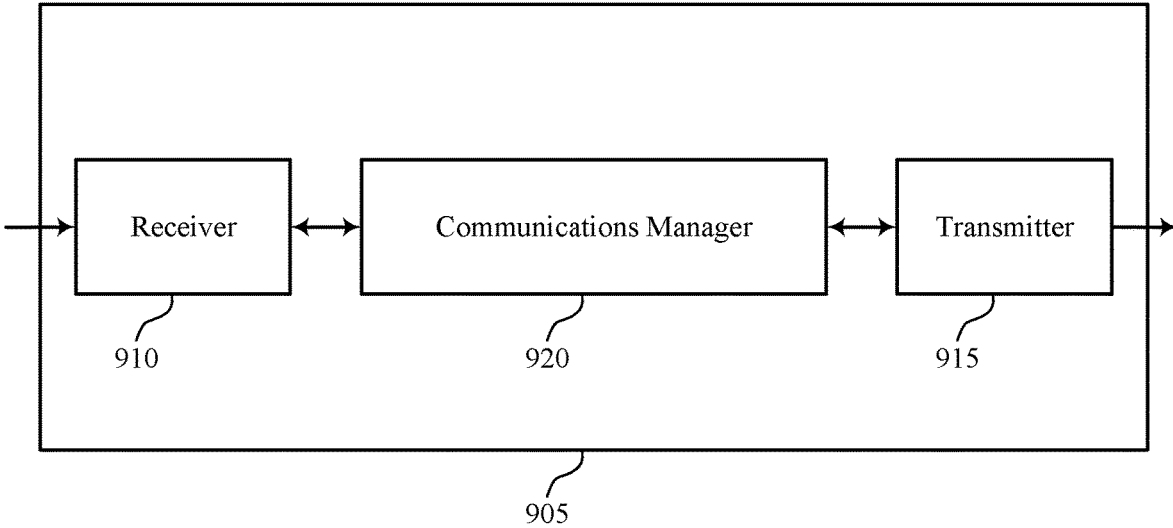
FIGS. 9 and 10 show block diagrams of devices that support UE assisted uplink synchronization for inter-cell mobility in accordance with one or more aspects of the present disclosure.
Figure 9:

FIG. 9 shows a block diagram 900 of a device 905 that supports UE assisted uplink synchronization for inter-cell mobility in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of UE assisted uplink synchronization for inter-cell mobility as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting an indication of a set of cells configured for communications with a UE. The communications manager 920 may be configured as or otherwise support a means for transmitting a first reference signal via a first cell of the set of cells, where the first cell is activated and includes a reference cell, and the first cell is different from a second, deactivated cell. The communications manager 920 may be configured as or otherwise support a means for receiving an indication of a timing difference between a first timing advance for communicating with the first cell and a second timing advance for communicating with the second cell.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources. Because the device 905 may receive timing differences between the timing advances at a UE 115 for communicating with a cell that is deactivated and timing differences at the UE 115 for communicating with a reference cell, the device 905 may maintain a timing advance for the UE 115 to use to communicate with the cell. Thus, when the cell is activated, the device 905 may signal the timing advance for the UE 115 to use to communicate with the cell, and the UE 115 may avoid performing a RACH procedure with the device 905 to identify the timing advance (e.g., resulting in the reduced processing, reduced power consumption, and more efficient utilization of communication resources).

Figure 10:
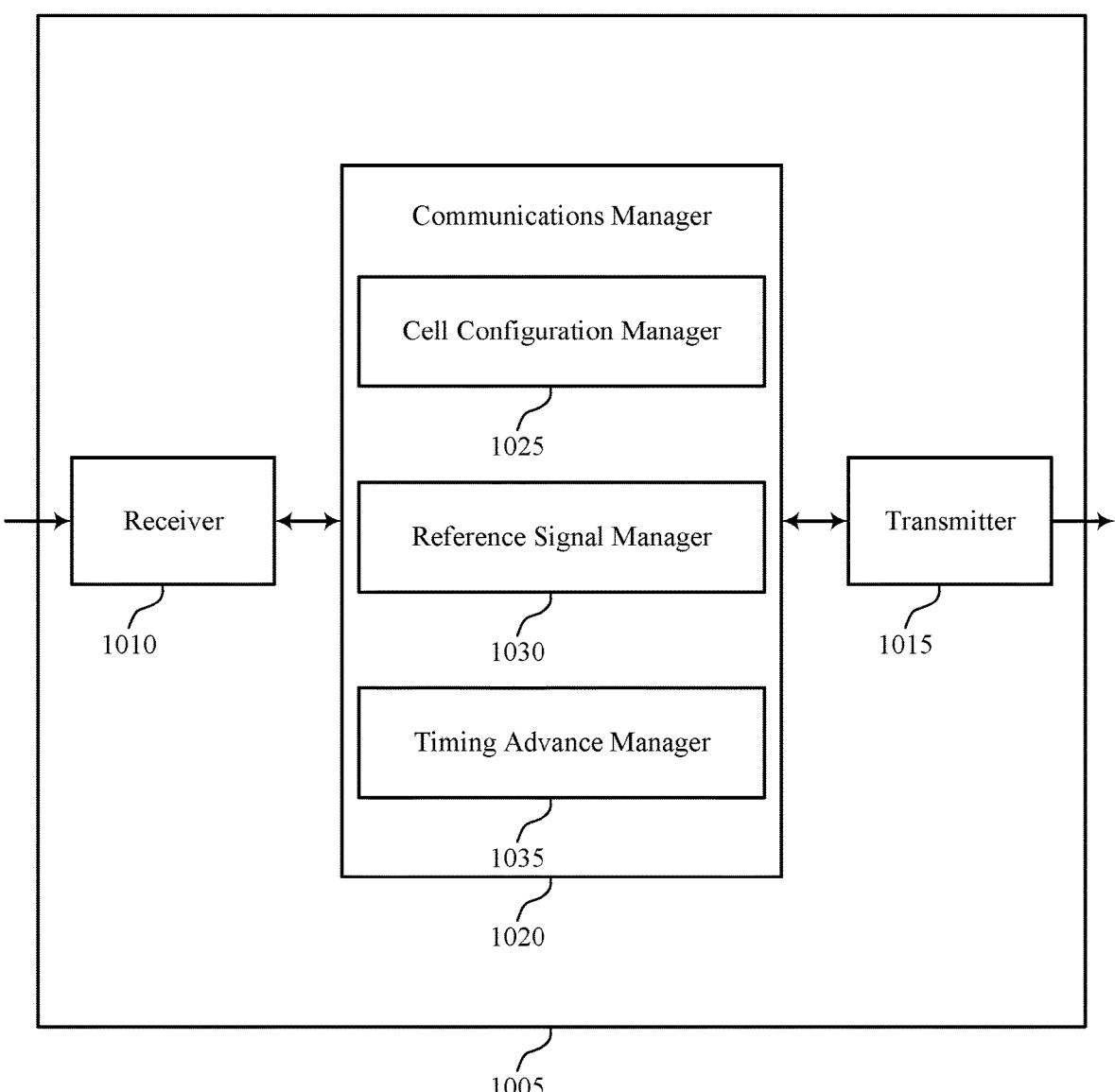

FIG. 10 shows a block diagram 1000 of a device 1005 that supports UE assisted uplink synchronization for inter-cell mobility in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of UE assisted uplink synchronization for inter-cell mobility as described herein. For example, the communications manager 1020 may include a cell configuration manager 1025, a reference signal manager 1030, a timing advance manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The cell configuration manager 1025 may be configured as or otherwise support a means for transmitting an indication of a set of cells configured for communications with a UE. The reference signal manager 1030 may be configured as or otherwise support a means for transmitting a first reference signal via a first cell of the set of cells, where the first cell is activated and includes a reference cell, and the first cell is different from a second, deactivated cell. The timing advance manager 1035 may be configured as or otherwise support a means for receiving an indication of a timing difference between a first timing advance for communicating with the first cell and a second timing advance for communicating with the second cell.

Figure 11:
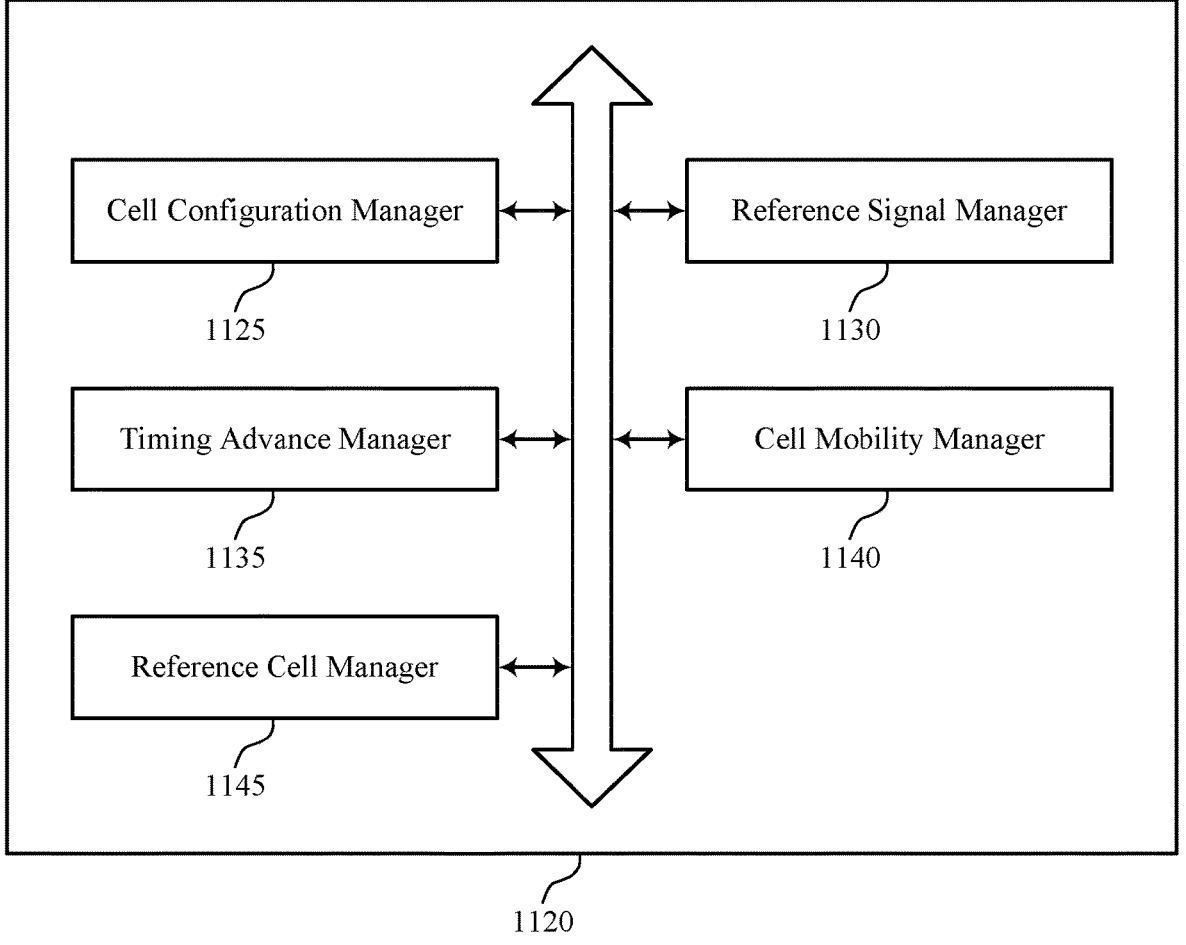
FIG. 11 shows a block diagram of a communications manager that supports UE assisted uplink synchronization for inter-cell mobility in accordance with one or more aspects of the present disclosure.

FIG. 11 shows a block diagram 1100 of a communications manager 1120 that supports UE assisted uplink synchronization for inter-cell mobility in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of UE assisted uplink synchronization for inter-cell mobility as described herein. For example, the communications manager 1120 may include a cell configuration manager 1125, a reference signal manager 1130, a timing advance manager 1135, a cell mobility manager 1140, a reference cell manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The cell configuration manager 1125 may be configured as or otherwise support a means for transmitting an indication of a set of cells configured for communications with a UE. The reference signal manager 1130 may be configured as or otherwise support a means for transmitting a first reference signal via a first cell of the set of cells, where the first cell is activated and includes a reference cell, and the first cell is different from a second, deactivated cell. The timing advance manager 1135 may be configured as or otherwise support a means for receiving an indication of a timing difference between a first timing advance for communicating with the first cell and a second timing advance for communicating with the second cell.

In some examples, the cell mobility manager 1140 may be configured as or otherwise support a means for transmitting an indication that the second cell is activated. In some examples, the timing advance manager 1135 may be configured as or otherwise support a means for transmitting an indication of the second timing advance for communicating with the second cell based on receiving the timing difference.

In some examples, to support receiving the indication of the timing difference, the timing advance manager 1135 may be configured as or otherwise support a means for receiving a periodic transmission including the indication of the timing difference.

In some examples, the timing advance manager 1135 may be configured as or otherwise support a means for transmitting an indication of a periodicity for periodic transmissions from the UE including indications of timing differences.

In some examples, to support receiving the indication of the timing difference, the timing advance manager 1135 may be configured as or otherwise support a means for receiving an aperiodic transmission including the indication of the timing difference.

In some examples, the timing advance manager 1135 may be configured as or otherwise support a means for transmitting an indication of one or more triggering conditions for the UE to transmit the timing difference, where receiving the aperiodic transmission is based on at least one of the one or more triggering conditions being satisfied.

In some examples, the one or more triggering conditions includes the timing difference satisfying a timing difference threshold, a change in the reference cell, or a combination thereof.

In some examples, the timing advance manager 1135 may be configured as or otherwise support a means for transmitting a request for the UE to transmit the timing difference, where receiving the aperiodic transmission is based on transmitting the request.

In some examples, the timing advance manager 1135 may be configured as or otherwise support a means for receiving a set of multiple timing differences between timing advances for communicating with the first cell and timing advances for communicating with the second cell, the set of multiple timing differences including the timing difference between the first timing advance and the second timing advance.

In some examples, the reference cell manager 1145 may be configured as or otherwise support a means for transmitting an indication that the first cell is the reference cell, where the first cell is selected as the reference cell based on cell quality, cell functionality, or a combination thereof.

In some examples, the timing advance manager 1135 may be configured as or otherwise support a means for transmitting an indication of a set of multiple configurations for the UE to use to transmit the timing difference. In some examples, the timing advance manager 1135 may be configured as or otherwise support a means for transmitting a control message indicating a configuration of the set of multiple configurations for the UE to use to transmit the timing difference, where receiving the indication of the timing difference is based on the configuration.

In some examples, the timing difference between the first timing advance and the second timing advance is based on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

In some examples, the indication of the timing difference is received in a medium access control control element or in a measurement report in uplink control information.

Figure 12:
FIG. 12 shows a diagram of a system including a device that supports UE assisted uplink synchronization for inter-cell mobility in accordance with one or more aspects of the present disclosure.

FIG. 12 shows a diagram of a system 1200 including a device 1205 that supports UE assisted uplink synchronization for inter-cell mobility in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting UE assisted uplink synchronization for inter-cell mobility). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting an indication of a set of cells configured for communications with a UE. The communications manager 1220 may be configured as or otherwise support a means for transmitting a first reference signal via a first cell of the set of cells, where the first cell is activated and includes a reference cell, and the first cell is different from a second, deactivated cell. The communications manager 1220 may be configured as or otherwise support a means for receiving an indication of a timing difference between a first timing advance for communicating with the first cell and a second timing advance for communicating with the second cell.

By including or configuring the communications manager 1220 in accordance with examples as described herein, the device 1205 may support techniques for reduced processing, reduced power consumption, and more efficient utilization of communication resources. Because the device 1205 may receive timing differences between the timing advances at a UE 115 for communicating with a cell that is deactivated and timing differences at the UE 115 for communicating with a reference cell, the device 1205 may maintain a timing advance for the UE 115 to use to communicate with the cell. Thus, when the cell is activated, the device 1205 may signal the timing advance for the UE 115 to use to communicate with the cell, and the UE 115 may avoid performing a RACH procedure with the device 1205 to identify the timing advance (e.g., resulting in the reduced processing, reduced power consumption, and more efficient utilization of communication resources).

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of UE assisted uplink synchronization for inter-cell mobility as described herein, or the processor 1235 and the memory 1225 may be otherwise configured to perform or support such operations.

FIG. 13 shows a flowchart illustrating a method 1300 that supports UE assisted uplink synchronization for inter-cell mobility in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of a set of cells configured for communications with the UE. The operations of 1305 may be performed in accordance with examples as disclosed herein. In some examples, aspects of the operations of 1305 may be performed by a cell configuration manager 725 as described with reference to FIG. 7.

At 1310, the method may include receiving a first reference signal from a first cell of the set of cells and a second reference signal from a second cell of the set of cells, where the first cell is activated and includes a reference cell, and the second cell is deactivated. The operations of 1310 may be performed in accordance with examples as disclosed herein. In some examples, aspects of the operations of 1310 may be performed by a reference signal manager 730 as described with reference to FIG. 7.

At 1315, the method may include transmitting an indication of a timing difference between a first timing advance for communicating with the first cell and a second timing advance for communicating with the second cell. The operations of 1315 may be performed in accordance with examples as disclosed herein. In some examples, aspects of the operations of 1315 may be performed by a timing advance manager 735 as described with reference to FIG. 7.

FIG. 14 shows a flowchart illustrating a method 1400 that supports UE assisted uplink synchronization for inter-cell mobility in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting an indication of a set of cells configured for communications with a UE. The operations of 1405 may be performed in accordance with examples as disclosed herein. In some examples, aspects of the operations of 1405 may be performed by a cell configuration manager 1125 as described with reference to FIG. 11.

At 1410, the method may include transmitting a first reference signal via a first cell of the set of cells, where the first cell is activated and includes a reference cell, and the first cell is different from a second, deactivated cell. The operations of 1410 may be performed in accordance with examples as disclosed herein. In some examples, aspects of the operations of 1410 may be performed by a reference signal manager 1130 as described with reference to FIG. 11.

At 1415, the method may include receiving an indication of a timing difference between a first timing advance for communicating with the first cell and a second timing advance for communicating with the second cell. The operations of 1415 may be performed in accordance with examples as disclosed herein. In some examples, aspects of the operations of 1415 may be performed by a timing advance manager 1135 as described with reference to FIG. 11.

The following provides an overview of aspects of the present disclosure:

Aspect 1: A method for wireless communication at a UE, comprising: receiving an indication of a set of cells configured for communications with the UE; receiving a first reference signal from a first cell of the set of cells and a second reference signal from a second cell of the set of cells, wherein the first cell is activated and comprises a reference cell, and the second cell is deactivated; and transmitting an indication of a timing difference between a first timing advance for communicating with the first cell and a second timing advance for communicating with the second cell.

Aspect 2: The method of aspect 1, further comprising: receiving an indication that the second cell is activated; receiving an indication of the second timing advance for communicating with the second cell based at least in part on transmitting the timing difference; and communicating with the second cell using the second timing advance.

Aspect 3: The method of any of aspects 1 through 2, wherein transmitting the indication of the timing difference comprises: transmitting a periodic transmission comprising the indication of the timing difference.

Aspect 4: The method of aspect 3, further comprising: receiving an indication of a periodicity for transmitting periodic transmissions comprising indications of timing differences.

Aspect 5: The method of any of aspects 1 through 4, wherein transmitting the indication of the timing difference comprises: transmitting an aperiodic transmission comprising the indication of the timing difference.

Aspect 6: The method of aspect 5, further comprising: identifying one or more triggering conditions for transmitting the timing difference, wherein transmitting the aperiodic transmission is based at least in part on at least one of the one or more triggering conditions being satisfied.

Aspect 7: The method of aspect 6, wherein the one or more triggering conditions comprise the timing difference satisfying a timing difference threshold, a change in the reference cell, or a combination thereof.

Aspect 8: The method of any of aspects 6 through 7, further comprising: receiving an indication of the one or more triggering conditions for transmitting the timing difference.

Aspect 9: The method of any of aspects 5 through 8, further comprising: receiving a request to transmit the timing difference, wherein transmitting the aperiodic transmission is based at least in part on receiving the request.

Aspect 10: The method of any of aspects 5 through 9, further comprising: transmitting a plurality of timing differences between timing advances for communicating with the first cell and timing advances for communicating with the second cell, the plurality of timing differences comprising the timing difference between the first timing advance and the second timing advance.

Aspect 11: The method of any of aspects 1 through 10, further comprising: receiving an indication that the first cell is the reference cell, wherein the first cell is selected as the reference cell based at least in part on cell quality, cell functionality, or a combination thereof Aspect 12: The method of any of aspects 1 through 11, further comprising: receiving an indication of a plurality of configurations for the UE to use to transmit the timing difference; and receiving a control message indicating a configuration of the plurality of configurations for the UE to use to transmit the timing difference, wherein transmitting the indication of the timing difference is based at least in part on the configuration.

Aspect 13: The method of any of aspects 1 through 12, wherein the timing difference between the first timing advance and the second timing advance is based at least in part on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

Aspect 14: The method of any of aspects 1 through 13, wherein the indication of the timing difference is transmitted in a medium access control control element or in a measurement report in uplink control information.

Aspect 15: A method for wireless communication at a network entity, comprising: transmitting an indication of a set of cells configured for communications with a UE; transmitting a first reference signal via a first cell of the set of cells, wherein the first cell is activated and comprises a reference cell, and the first cell is different from a second, deactivated cell; and receiving an indication of a timing difference between a first timing advance for communicating with the first cell and a second timing advance for communicating with the second cell.

Aspect 16: The method of aspect 15, further comprising: transmitting an indication that the second cell is activated; and transmitting an indication of the second timing advance for communicating with the second cell based at least in part on receiving the timing difference.

Aspect 17: The method of any of aspects 15 through 16, wherein receiving the indication of the timing difference comprises: receiving a periodic transmission comprising the indication of the timing difference.

Aspect 18: The method of aspect 17, further comprising: transmitting an indication of a periodicity for periodic transmissions from the UE comprising indications of timing differences.

Aspect 19: The method of any of aspects 15 through 18, wherein receiving the indication of the timing difference comprises: receiving an aperiodic transmission comprising the indication of the timing difference.

Aspect 20: The method of aspect 19, further comprising: transmitting an indication of one or more triggering conditions for the UE to transmit the timing difference, wherein receiving the aperiodic transmission is based at least in part on at least one of the one or more triggering conditions being satisfied.

Aspect 21: The method of aspect 20, wherein the one or more triggering conditions comprises the timing difference satisfying a timing difference threshold, a change in the reference cell, or a combination thereof.

Aspect 22: The method of any of aspects 19 through 21, further comprising: transmitting a request for the UE to transmit the timing difference, wherein receiving the aperiodic transmission is based at least in part on transmitting the request.

Aspect 23: The method of any of aspects 19 through 22, further comprising: receiving a plurality of timing differences between timing advances for communicating with the first cell and timing advances for communicating with the second cell, the plurality of timing differences comprising the timing difference between the first timing advance and the second timing advance.

Aspect 24: The method of any of aspects 15 through 23, further comprising: transmitting an indication that the first cell is the reference cell, wherein the first cell is selected as the reference cell based at least in part on cell quality, cell functionality, or a combination thereof Aspect 25: The method of any of aspects 15 through 24, further comprising: transmitting an indication of a plurality of configurations for the UE to use to transmit the timing difference; and transmitting a control message indicating a configuration of the plurality of configurations for the UE to use to transmit the timing difference, wherein receiving the indication of the timing difference is based at least in part on the configuration.

Aspect 26: The method of any of aspects 15 through 25, wherein the timing difference between the first timing advance and the second timing advance is based at least in part on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof Aspect 27: The method of any of aspects 15 through 26, wherein the indication of the timing difference is received in a medium access control control element or in a measurement report in uplink control information.

Aspect 28: An apparatus for wireless communication at a UE, comprising a processor; memory coupled with the processor; and instructions stored in the memory and executable by the processor to cause the apparatus to perform a method of any of aspects 1 through 14.

Aspect 29: An apparatus for wireless communication at a UE, comprising at least one means for performing a method of any of aspects 1 through 14.

Aspect 30: A non-transitory computer-readable medium storing code for wireless communication at a UE, the code comprising instructions executable by a processor to perform a method of any of aspects 1 through 14.

Aspect 31: An apparatus for wireless communication at a network entity, comprising a processor; memory coupled with the processor; and instructions stored in the memory and executable by the processor to cause the apparatus to perform a method of any of aspects 15 through 27.

Aspect 32: An apparatus for wireless communication at a network entity, comprising at least one means for performing a method of any of aspects 15 through 27.

Aspect 33: A non-transitory computer-readable medium storing code for wireless communication at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
   receive an indication of a set of cells configured for communications with the UE;
   receive a first reference signal from a first cell of the set of cells and a second reference signal from a second cell of the set of cells, wherein the first cell is activated and comprises a reference cell, and the second cell is deactivated;
   measure, while the second cell is deactivated, the second reference signal;
   identify one or more triggering conditions for transmitting a timing difference between a first timing advance for communicating with the first cell and a second timing advance for communicating with the second cell, wherein the one or more triggering conditions comprise the timing difference satisfying a timing difference threshold, a change in the reference cell, or a combination thereof; and
   transmit, to the first cell and while the second cell is deactivated and based at least in part on at least one of the one or more triggering conditions being satisfied, an indication of the timing difference between the first timing advance for communicating with the first cell and the second timing advance for communicating with the second cell.

2. The apparatus of claim 1, wherein the instructions are further executable by the one or more processors to cause the apparatus to:
   receive an indication that the second cell is activated;
   receive an indication of the second timing advance for communicating with the second cell based at least in part on transmitting the timing difference; and
   communicate with the second cell using the second timing advance.

3. The apparatus of claim 1, wherein the instructions to transmit the indication of the timing difference are executable by the one or more processors to cause the apparatus to:

transmit an aperiodic transmission comprising the indication of the timing difference.

4. The apparatus of claim 3, wherein the instructions are further executable by the one or more processors to cause the apparatus to:

receive a request to transmit the timing difference, wherein transmitting the aperiodic transmission is based at least in part on receiving the request.

5. The apparatus of claim 3, wherein the instructions are further executable by the one or more processors to cause the apparatus to:

transmit a plurality of timing differences between timing advances for communicating with the first cell and timing advances for communicating with the second cell, the plurality of timing differences comprising the timing difference between the first timing advance and the second timing advance.

6. The apparatus of claim 1, wherein the instructions are further executable by the one or more processors to cause the apparatus to:

receive an indication of the one or more triggering conditions for transmitting the timing difference.

7. The apparatus of claim 1, wherein the instructions are further executable by the one or more processors to cause the apparatus to:

receive an indication that the first cell is the reference cell, wherein the first cell is selected as the reference cell based at least in part on cell quality, cell functionality, or a combination thereof.

8. The apparatus of claim 1, wherein the instructions are further executable by the one or more processors to cause the apparatus to:

receive an indication of a plurality of configurations for the UE to use to transmit the timing difference; and receive a control message indicating a configuration of the plurality of configurations for the UE to use to transmit the timing difference, wherein transmitting the indication of the timing difference is based at least in part on the configuration.

9. The apparatus of claim 1, wherein the timing difference between the first timing advance and the second timing advance is based at least in part on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

10. The apparatus of claim 1, wherein the indication of the timing difference is transmitted in a medium access control control element or in a measurement report in uplink control information.

11. An apparatus for wireless communication at a network entity, comprising:

one or more processors;

one or more memories coupled with the one or more processors; and instructions stored in the one or more memories and executable by the one or more processors to cause the apparatus to:

transmit an indication of a set of cells configured for communications with a user equipment (UE);

transmit a first reference signal via a first cell of the set of cells, wherein the first cell is activated and comprises a reference cell, and the first cell is different from a second cell that is deactivated;

transmit an indication of one or more triggering conditions for the UE to transmit a timing difference between a first timing advance for communicating with the first cell and a second timing advance for communicating with the second cell, wherein the one or more triggering conditions comprises the timing difference satisfying a timing difference threshold, a change in the reference cell, or a combination thereof; and receive, from the UE and while the second cell is deactivated and based at least in part on at least one of the one or more triggering conditions being satisfied, an indication of the timing difference between the first timing advance for communicating with the first cell and the second timing advance for communicating with the second cell.

12. The apparatus of claim 11, wherein the instructions are further executable by the one or more processors to cause the apparatus to:

transmit an indication that the second cell is activated; and transmit an indication of the second timing advance for communicating with the second cell based at least in part on receiving the timing difference.

13. The apparatus of claim 11, wherein the instructions to receive the indication of the timing difference are executable by the one or more processors to cause the apparatus to:

receive an aperiodic transmission comprising the indication of the timing difference.

14. The apparatus of claim 13, wherein the instructions are further executable by the one or more processors to cause the apparatus to:

transmit a request for the UE to transmit the timing difference, wherein receiving the aperiodic transmission is based at least in part on transmitting the request.

15. The apparatus of claim 13, wherein the instructions are further executable by the one or more processors to cause the apparatus to:

receive a plurality of timing differences between timing advances for communicating with the first cell and timing advances for communicating with the second cell, the plurality of timing differences comprising the timing difference between the first timing advance and the second timing advance.

16. The apparatus of claim 11, wherein the instructions are further executable by the one or more processors to cause the apparatus to:

transmit an indication that the first cell is the reference cell, wherein the first cell is selected as the reference cell based at least in part on cell quality, cell functionality, or a combination thereof.

17. The apparatus of claim 11, wherein the instructions are further executable by the one or more processors to cause the apparatus to:

transmit an indication of a plurality of configurations for the UE to use to transmit the timing difference; and transmit a control message indicating a configuration of the plurality of configurations for the UE to use to transmit the timing difference, wherein receiving the indication of the timing difference is based at least in part on the configuration.

18. The apparatus of claim 11, wherein the timing difference between the first timing advance and the second timing advance is based at least in part on a downlink propagation delay difference between a first downlink propagation delay associated with the first cell and a second downlink propagation delay associated with the second cell, a difference between a first downlink signal reception time associated with the first cell and a second downlink signal reception time associated with the second cell, or a combination thereof.

19. The apparatus of claim 11, wherein the indication of the timing difference is received in a medium access control control element or in a measurement report in uplink control information.

20. A method for wireless communication at a user equipment (UE), comprising:

receiving an indication of a set of cells configured for communications with the UE;

receiving a first reference signal from a first cell of the set of cells and a second reference signal from a second cell of the set of cells, wherein the first cell is activated and comprises a reference cell, and the second cell is deactivated;

measuring, while the second cell is deactivated, the second reference signal;

identifying one or more triggering conditions for transmitting a timing difference between a first timing advance for communicating with the first cell and a second timing advance for communicating with the second cell, wherein the one or more triggering conditions comprise the timing difference satisfying a timing difference threshold, a change in the reference cell, or a combination thereof; and transmitting, to the first cell and while the second cell is deactivated and based at least in part on at least one of the one or more triggering conditions being satisfied, an indication of the timing difference between the first timing advance for communicating with the first cell and the second timing advance for communicating with the second cell.

21. The method of claim 20, further comprising:

receiving an indication that the second cell is activated;

receiving an indication of the second timing advance for communicating with the second cell based at least in part on transmitting the timing difference; and communicating with the second cell using the second timing advance.

22. A method for wireless communication at a network entity, comprising:

transmitting an indication of a set of cells configured for communications with a user equipment (UE);

transmitting a first reference signal via a first cell of the set of cells, wherein the first cell is activated and comprises a reference cell, and the first cell is different from a second cell that is deactivated;

transmitting an indication of one or more triggering conditions for the UE to transmit a timing difference between a first timing advance for communicating with the first cell and a second timing advance for communicating with the second cell, wherein the one or more triggering conditions comprises the timing difference satisfying a timing difference threshold, a change in the reference cell, or a combination thereof; and receiving, from the UE and while the second cell is deactivated and based at least in part on at least one of the one or more triggering conditions being satisfied, an indication of the timing difference between the first timing advance for communicating with the first cell and the second timing advance for communicating with the second cell.

* * * * *